United States Patent
Zhang et al.

(10) Patent No.: US 10,958,181 B2
(45) Date of Patent: Mar. 23, 2021

(54) ELECTRIC VEHICLE, DC-DC CONVERTOR, AND CONTROL METHOD FOR DC-DC CONVERTOR

(71) Applicant: BYD COMPANY LIMITED, Guangdong (CN)

(72) Inventors: Ni Zhang, Shenzhen (CN); Xinghui Wang, Shenzhen (CN); Chao Wang, Shenzhen (CN); Xiaofeng Shen, Shenzhen (CN); Baihe Wu, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 21 days.

(21) Appl. No.: 16/465,944

(22) PCT Filed: Dec. 1, 2017

(86) PCT No.: PCT/CN2017/114234
§ 371 (c)(1),
(2) Date: May 31, 2019

(87) PCT Pub. No.: WO2018/099468
PCT Pub. Date: Jun. 7, 2018

(65) Prior Publication Data
US 2020/0083815 A1    Mar. 12, 2020

(30) Foreign Application Priority Data

Dec. 2, 2016    (CN) .......................... 2016 1 1109744

(51) Int. Cl.
*H02J 7/00*    (2006.01)
*H02M 7/5395*    (2006.01)
(Continued)

(52) U.S. Cl.
CPC ......... *H02M 3/33576* (2013.01); *B60L 53/22* (2019.02); *H02J 7/00* (2013.01);
(Continued)

(58) Field of Classification Search
None
See application file for complete search history.

(56) References Cited

U.S. PATENT DOCUMENTS 10,625,616 B2 *    4/2020    Wang ................. B60L 11/1851
2013/0051083 A1    2/2013    Zhao
(Continued)

FOREIGN PATENT DOCUMENTS

CN    101162874 A    4/2008
CN    101800472 A    8/2010
(Continued)

OTHER PUBLICATIONS

Tsu-Hua Ai et al, "A hybrid switching method for thermal management in full-bridge inverter", Power Electronics and Drive Systems, 2001. Proceedings., 2001 4th IEEE International Conference ON, Piscataway, NJ, USA,IEEE, (Oct. 22, 2001), vol. 2, ISBN 978-0-7803-7233-7, pp. 633-637, XP010571603 [I] 1,4-6,9-11.
(Continued)

*Primary Examiner* — Kenneth B Wells
(74) *Attorney, Agent, or Firm* — Calfee Halter & Griswold LLP

(57) ABSTRACT

A control method includes the following steps: when the DC-DC converter works every time, acquiring total time TC for controlling an H-bridge in a third mode and total time TD for controlling the H-bridge in a fourth mode, and acquiring set time Ti for controlling the H-bridge in the third mode and
(Continued)

set time Tm for controlling the H-bridge in the fourth mode in each working cycle during a working process of the DC-DC converter; judging a relation between the TC and the TD; and selecting the mode for controlling the H-bridge when the DC-DC converter is started according to the relation between the total time TC and the total time TD, and alternately controlling the H-bridge according to the Ti and the Tm, the second switch transistor, the third switch transistor and the fourth switch transistor in the H-bridge to be relatively balanced.

20 Claims, 4 Drawing Sheets

(51) Int. Cl.
*H02J 7/14* (2006.01)
*H02M 7/5387* (2007.01)
*B60L 53/22* (2019.01)
*B60L 58/10* (2019.01)
*B60L 53/14* (2019.01)
*B60L 53/60* (2019.01)
*H02M 7/793* (2006.01)
*H02M 1/00* (2006.01)
*H02M 1/32* (2007.01)
*H02M 7/219* (2006.01)
*H02M 3/335* (2006.01)
*H02M 1/088* (2006.01)
*H02M 1/36* (2007.01)

(52) U.S. Cl.
CPC .............. *H02M 1/088* (2013.01); *H02M 1/36* (2013.01); *B60L 2210/10* (2013.01); *H02J 2207/20* (2020.01)

(56) References Cited

U.S. PATENT DOCUMENTS

| 2014/0177281 A1 | 6/2014 | Lai et al. |
| 2015/0055374 A1 | 2/2015 | Yamashita et al. |

FOREIGN PATENT DOCUMENTS

| CN | 102611348 A | 7/2012 |
| CN | 103259443 A | 8/2013 |
| CN | 103441692 A | 12/2013 |
| CN | 203423529 U | 2/2014 |
| CN | 103795233 A | 5/2014 |
| CN | 104600998 A | 5/2015 |
| CN | 104868765 A | 8/2015 |
| CN | 104898486 A | 9/2015 |
| CN | 105324205 A | 2/2016 |
| CN | 106169873 A | 11/2016 |
| CN | 106891737 A | 6/2017 |
| CN | 106891740 A | 6/2017 |
| CN | 106891742 A | 6/2017 |
| CN | 106891745 A | 6/2017 |
| CN | 106891750 A | 6/2017 |
| CN | 106891751 A | 6/2017 |
| CN | 106891752 A | 6/2017 |
| CN | 106904083 A | 6/2017 |
| JP | 2011-30380 A | 2/2011 |

OTHER PUBLICATIONS

English Translation of International Search Report from PCT/CN2017/114234 dated Mar. 2, 2018 (3 pages).

Qin, et al., "Comparison of Two Chopping Control Modes for Doubly Salient Permanent Magnet Motor," School Automation Engineering, Nanjing University, Proceedings of the CSU-EPSA, vol. 17, No. 4, Aug. 2005, pp. 1-6, English Abstract.

Intersil ZVS, High Efficiency DC-DC Converter Basing on Intersil Full-Bridge ZVS Controller, Power Management Devices, gec.eccn.com, 2008, pp. 62-66.

* cited by examiner

ELECTRIC VEHICLE, DC-DC CONVERTOR, AND CONTROL METHOD FOR DC-DC CONVERTOR

CROSS-REFERENCE TO RELATED APPLICATIONS

This application is the U.S. national phase entry of PCT Application No. PCT/CN2017/114234, filed Dec. 1, 2017, which claims priority to and benefits of Chinese Patent Application Serial No. 201611109744.2, filed with the State Intellectual Property Office of P. R. China on Dec. 2, 2016, the title being "ELECTRIC VEHICLE, DC-DC CONVERTER THEREOF AND CONTROL METHOD OF DC-DC CONVERTER". The entire contents of the above-referenced applications are incorporated herein by reference.

FIELD

The present disclosure relates to the field of electric vehicles technologies, and more particularly, relates to a control method of a DC-DC converter, a DC-DC converter and an electric vehicle.

BACKGROUND

A DC-DC converter has always been an important component of the field of power electronics. With the development of commercialization of an electric vehicle, the DC-DC converter has become one of the important parts of the electric vehicle. The DC-DC converter has many topological structures. In the medium and large-scale power field, a full-bridge pulse width modulation (PWM) converter is one of the most used topologies.

The full-bridge PWM converter has many control modes. Related technologies mostly adopt a control mode of phase shift modulation and a control mode of lower transistor modulation. However, when the control mode of phase shift modulation is adopted, leading arms easily realize soft switching, and lagging arms do not easily realize soft switching, so that the lagging arms are more serious than the leading arms in heat generation; and when the control mode of lower transistor modulation is adopted, upper transistors easily realize soft switching, and lower transistors do not easily realize soft switching, so that the lower transistors are more serious than the upper transistors in heat generation.

Therefore, both of the two control modes cause the problem of serious heat generation of switch transistors, and the working life of the switch transistors is affected.

SUMMARY

A first aspect of the present disclosure is to provide a control method of a DC-DC converter, which is capable of enabling the heat generation of a first switch transistor, a second switch transistor, a third switch transistor and a fourth switch transistor in an H-bridge to be relatively balanced, so as to prolong the working life of the switch transistors in the H-bridge.

A second aspect of the present disclosure is to provide a DC-DC converter. A third objective of the present disclosure is to provide an electric vehicle.

The control method of the DC-DC converter according to the embodiments of the present disclosure, the DC-DC converter comprises an H-bridge, the H-bridge comprises a first switch transistor, a second switch transistor, a third switch transistor, and a fourth switch transistor, and the control method includes the following steps: acquiring a total time TC for controlling the H-bridge in a third mode and a total time TD for controlling the H-bridge in a fourth mode, and acquiring a set time Ti for controlling the H-bridge in the third mode and a set time Tm for controlling the H-bridge in the fourth mode in each working cycle during a working process of the DC-DC converter when the DC-DC converter operates, wherein the first switch transistor and the third switch transistor are configured as upper transistors, the second switch transistor and the fourth switch transistor are configured as lower transistors when the H-bridge is controlled in the third mode, and the first switch transistor, the second switch transistor, the third switch transistor, and the fourth switch transistor are controlled by adopting a control mode of lower transistor modulation; and the first switch transistor and the third switch transistor are configured as lower transistors, the second switch transistor and the fourth switch transistor are configured as upper transistors when the H-bridge is controlled in the fourth mode, and the first switch transistor, the second switch transistor, the third switch transistor, and the fourth switch transistor are controlled by adopting a control mode of lower transistor modulation; determining a relation between the total time TC and the total time TD; and selecting the mode for controlling the H-bridge when the DC-DC converter is started according to the relation between the total time TC and the total time TD, and alternately controlling the H-bridge according to the set time Ti and the set time Tm, so as to perform temperature equalization control on the first switch transistor, the second switch transistor, the third switch transistor, and the fourth switch transistor.

An embodiment of another aspect of the present disclosure provides a DC-DC converter, including an H-bridge, where the H-bridge includes a first switch transistor, a second switch transistor, a third switch transistor and a fourth switch transistor; and a control module, where the control module is configured to acquire a total time TC for controlling the H-bridge in a third mode and a total time TD for controlling the H-bridge in a fourth mode when the DC-DC converter works, to acquire a set time Ti for controlling the H-bridge in the third mode and a set time Tm for controlling the H-bridge in the fourth mode in each working cycle during a working process of the DC-DC converter, to select the mode for controlling the H-bridge when the DC-DC converter is started by determining a relation between the total time TC and the total time TD, and to alternately control the H-bridge according to the set time Ti and the set time Tm, so as to perform temperature equalization control on the first switch transistor, the second switch transistor, the third switch transistor, and the fourth switch transistor. When the H-bridge is controlled in the third mode, the control module uses the first switch transistor and the third switch transistor as upper transistors, uses the second switch transistor and the fourth switch transistor as lower transistors, and controls the first switch transistor, the second switch transistor, the third switch transistor and the fourth switch transistor by adopting a control mode of lower transistor modulation. When the H-bridge is controlled in the fourth mode, the control module uses the first switch transistor and the third switch transistor as lower transistors, uses the second switch transistor and the fourth switch transistor as upper transistors, and controls the first switch transistor, the second switch transistor, the third switch transistor and the fourth switch transistor by adopting a control mode of lower transistor modulation.

When the DC-DC converter according to the embodiments of the present disclosure works every time, the control module is used for acquiring the total time TC for controlling the H-bridge in the third mode and the total time TD for controlling the H-bridge in the fourth mode, acquiring the set time Ti for controlling the H-bridge in the third mode and the set time Tm for controlling the H-bridge in the fourth mode in each working cycle during the working process, selecting the mode for controlling the H-bridge when the DC-DC converter is started by judging the relation between the total time TC and the total time TD, and alternately controlling the H-bridge according to the Ti and the Tm during the working process of the DC-DC converter, so as to perform temperature equalization control on the first switch transistor, the second switch transistor, the third switch transistor and the fourth switch transistor, thereby enabling the heat generation of each switch transistor to be relatively balanced, prolonging the working life of the switch transistors in the H-bridge without increasing the cost, and further prolonging the life cycle.

Furthermore, an embodiment of the present disclosure also provides an electric vehicle, including the DC-DC converter.

When the DC-DC converter of the electric vehicle according to the embodiment of the present disclosure works every time, the temperature equalization control on the first switch transistor, the second switch transistor, the third switch transistor and the fourth switch transistor in the H-bridge can be realized, thereby enabling the heat generation of each switch transistor to be relatively balanced, prolonging the working life of the switch transistors in the H-bridge without increasing the cost, and further prolonging the life cycle of the DC-DC converter.

DETAILED DESCRIPTION

Embodiments of the present disclosure are described in detail as follows. Examples of the embodiments are shown in the accompanying drawings, in which the same or similar reference signs always represent the same or similar elements or elements having the same or similar functions. The embodiments described below with reference to the accompanying drawings are exemplary, and are used for explaining rather than limiting the present disclosure.

A control method of a DC-DC converter, the DC-DC converter and the electric vehicle having the DC-DC converter, provided by the embodiments of the present disclosure, are described below with reference to the accompanying drawings.

Figure 1:
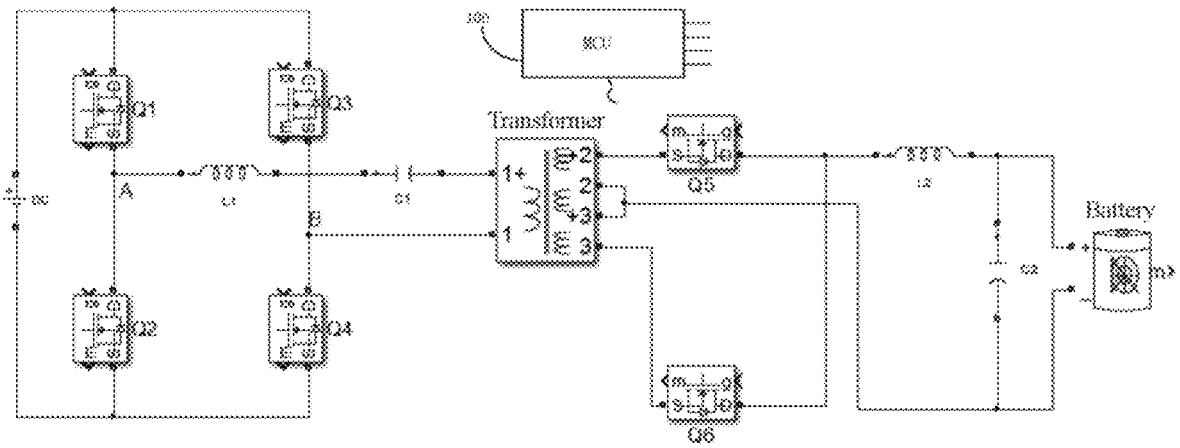
FIG. 1 is a circuit diagram of a DC-DC converter according to an embodiment of the present disclosure.

As shown in FIG. 1, the DC-DC converter according to an embodiment of the present disclosure includes an H-bridge, and the H-bridge can include a first switch transistor Q1, a second switch transistor Q2, a third switch transistor Q3 and a fourth switch transistor Q4. A first node A is formed between the first switch transistor Q1 and the second switch transistor Q2, and a second node B is formed between the third switch transistor Q3 and the fourth switch transistor Q4.

Furthermore, as shown in FIG. 1, the DC-DC converter also includes a transformer, a first inductor L1, a first capacitor C1, a second inductor L2, a second capacitor C2, a fifth switch transistor Q5 and a sixth switch transistor Q6. One end of the first inductor L1 is connected with the first node A, the other end of the first inductor L1 is connected with one end of the first capacitor C1, the other end of the first capacitor C1 is connected with one end of a primary winding of the transformer, the other end of the primary winding of the transformer is connected with the second node B, a secondary winding of the transformer is respectively connected with the fifth switch transistor Q5 and the sixth switch transistor Q6, and the second inductor L2 and the second capacitor C2 are connected to an output end of the DC-DC converter.

Figure 2:
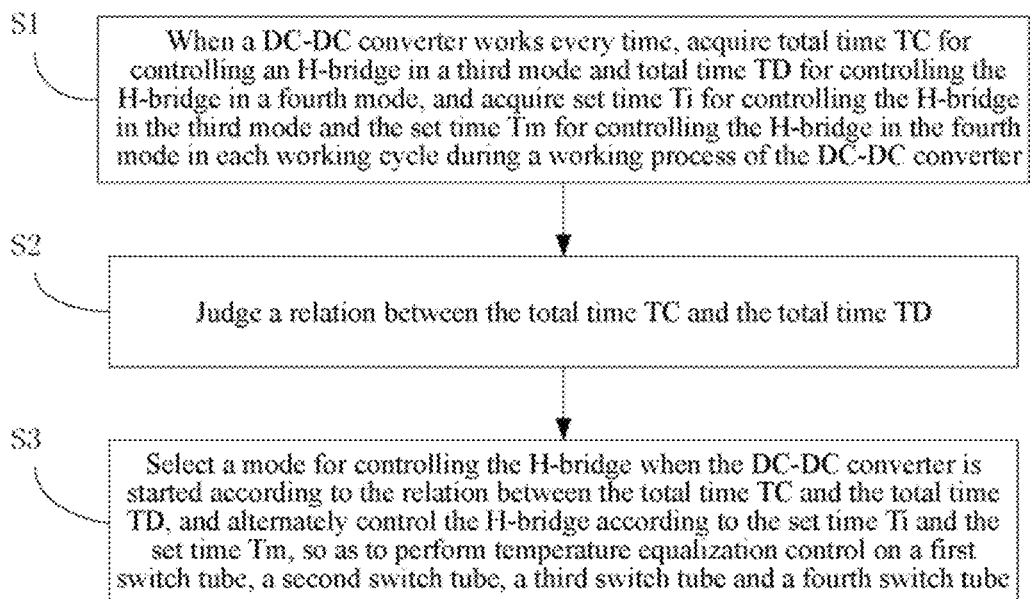
FIG. 2 is a flowchart of a control method of the DC-DC converter according to the embodiments of the present disclosure.

In the embodiments of the present disclosure, as shown in FIG. 2, the control method of the DC-DC converter includes the following steps:

S1, when the DC-DC converter works every time, acquire total time TC for controlling the H-bridge in a third mode and total time TD for controlling the H-bridge in a fourth mode, and acquire set time Ti for controlling the H-bridge in the third mode and set time Tm for controlling the H-bridge in the fourth mode in each working cycle during a working process of the DC-DC converter.

When the H-bridge is controlled in the third mode, the first switch transistor and the third switch transistor are used as upper transistors, the second switch transistor and the fourth switch transistor are used as lower transistors, and the first switch transistor, the second switch transistor, the third switch transistor and the fourth switch transistor are controlled by adopting a control mode of lower transistor modulation. When the H-bridge is controlled in the fourth mode, the first switch transistor and the third switch transistor are used as lower transistors, the second switch transistor and the fourth switch transistor are used as upper transistors, and the first switch transistor, the second switch transistor, the third switch transistor and the fourth switch transistor are controlled by adopting a control mode of lower transistor modulation.

According to an embodiment of the present disclosure, when the H-bridge is controlled in the third mode, a control signal output to the first switch transistor Q1 and a control signal output to the third switch transistor Q3 are complementary and have a fixed duty ratio, and falling edges of control signals output to the second switch transistor Q2 and the fourth switch transistor Q4 are subjected to PWM control.

Figure 3:
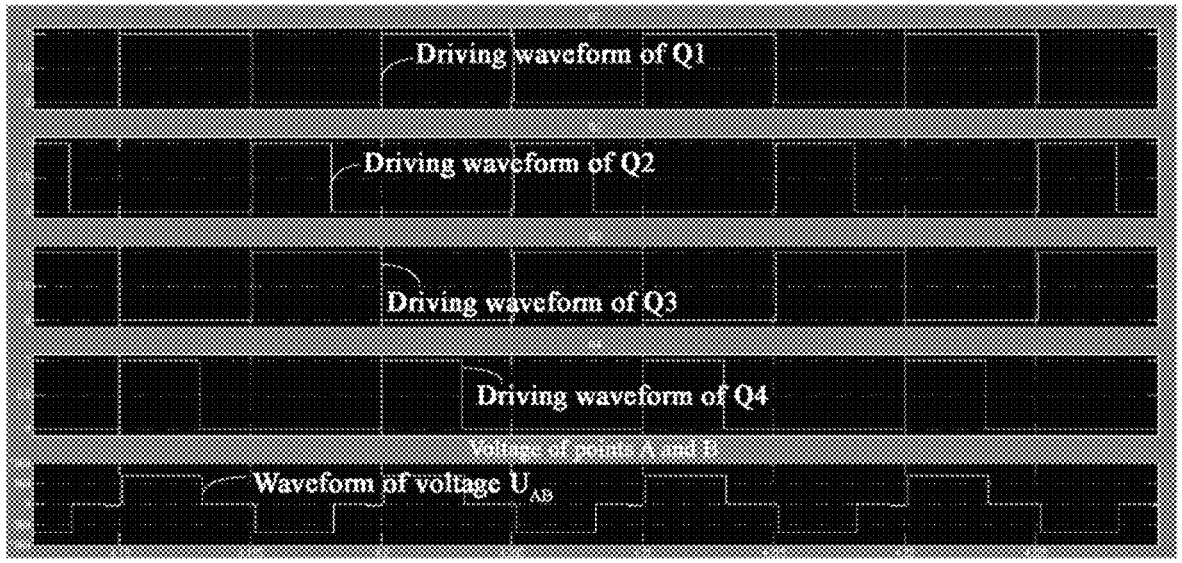
FIG. 3 is a schematic diagram of driving waveforms of four switch transistors when an H-bridge is controlled in a third mode according to an embodiment of the present disclosure.

In an embodiment, the driving waveform of the first switch transistor Q1, the driving waveform of the second switch transistor Q2, the driving waveform of the third switch transistor Q3, a driving waveform of the fourth switch transistor Q4, and the waveform of voltage UAB between two bridge arms of the H-bridge are as shown in FIG. 3. As can be seen from FIG. 3, in the four switch transistors of the H-bridge, the control signals of Q1 and Q3 are complementary and have a fixed duty ratio (50%), falling edges of Q2 and Q4 are modulated according to PWM rules, and the output voltage is adjusted by adjusting the driving voltage falling edges of the lower transistors.

Furthermore, when the H-bridge is controlled in the fourth mode, the control signal output to the second switch transistor Q2 and the control signal output to the fourth switch transistor Q4 are complementary and have a fixed duty ratio, and falling edges of the control signals output to the first switch transistor Q1 and the third switch transistor Q3 are subjected to PWM control.

Figure 4:
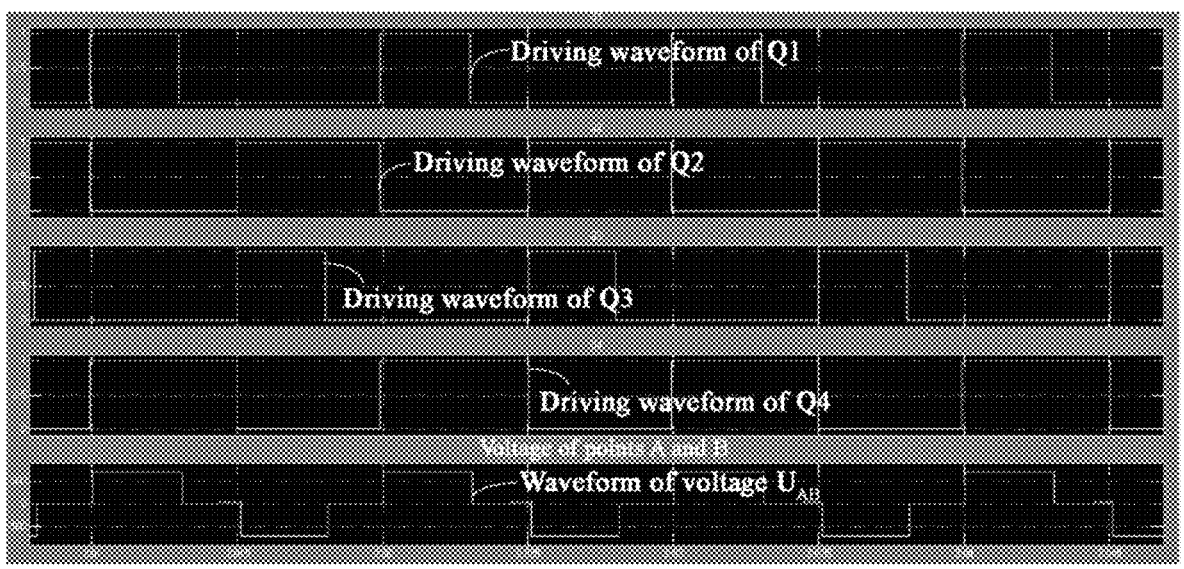
FIG. 4 is a schematic diagram of driving waveforms of four switch transistors when the H-bridge is controlled in a fourth mode according to an embodiment of the present disclosure.

In an embodiment, the driving waveform of the first switch transistor Q1, the driving waveform of the second switch transistor Q2, the driving waveform of the third switch transistor Q3, the driving waveform of the fourth switch transistor Q4, and the waveform of the voltage UAB between two bridge arms of the H-bridge are as shown in FIG. 4. As can be seen from FIG. 4, in the four switch transistors of the H-bridge, the control signals of Q2 and Q4 of the H-bridge are complementary and have a fixed duty ratio (50%), falling edges of Q1 and Q3 are modulated according to PWM rules, and the output voltage is adjusted by adjusting the driving voltage falling edges of the lower transistors.

S2, judge a relation between the total time TC and the total time TD.

S3, select the mode for controlling the H-bridge when the DC-DC converter is started according to the relation between the total time TC and the total time TD, and alternately control the H-bridge according to the set time Ti and the set time Tm, so as to perform temperature equalization control on the first switch transistor, the second switch transistor, the third switch transistor and the fourth switch transistor.

It should be noted that, during the working process of the DC-DC converter, if the H-bridge is controlled in the third mode C only, because only a primary-side resonant inductor can be utilized in a resonant discharge stage, the switch transistors Q2 and Q4 used as lower transistors difficultly realize soft switching (namely zero voltage switching), and the switch transistors Q2 and Q4 have great switching loss and are overheated.

Similarly, during the working process of the DC-DC converter, if the H-bridge is controlled in the fourth mode D only, because only the primary-side resonant inductor can be utilized in the resonant discharge stage, the switch transistors Q1 and Q3 used as lower transistors difficultly realize soft switching (namely zero voltage switching), and the switch transistors Q1 and Q3 have great switching loss and are overheated.

Therefore, in the embodiments of the present disclosure, when the H-bridge is controlled in the third mode C to enable the DC-DC converter to work, the time for controlling the H-bridge in the third mode C is recorded to obtain the total time TC for controlling the H-bridge in the third mode, and then, the total time TC is stored; when the H-bridge is controlled in the fourth mode D to enable the DC-DC converter to work, the time for controlling the H-bridge in the fourth mode D is recorded to obtain the total time TD for controlling the H-bridge in the fourth mode, and then, the total time TD is stored; then, when the DC-DC converter is started every time, the relation between the total time TC and the total time TD is judged; and finally, the mode for controlling the H-bridge when the DC-DC converter is started is selected according to the relation between the total time TC and the total time TD.

In an embodiment, according to an embodiment of the present disclosure, in the process of selecting the mode for controlling the H-bridge when the DC-DC converter is started according to the relation between the total time TC and the total time TD, when the total time TC is greater than the total time TD, the fourth mode is selected for controlling the H-bridge when the DC-DC converter is started until the total time TC is equal to the total time TD; when the total time TC is less than the total time TD, the third mode is selected for controlling the H-bridge when the DC-DC converter is started until the total time TC is equal to the total time TD; and when the total time TC is equal to the total time TD, the third mode or the fourth mode is selected for alternately controlling the H-bridge according to the Ti and the Tm when the DC-DC converter is started.

Alternately controlling the H-bridge according to the set time Ti and the set time Tm includes: when the time for controlling the H-bridge in the third mode reaches the Ti, controlling the H-bridge in the fourth mode until the time for controlling the H-bridge in the fourth mode reaches the Tm; or when the time for controlling the H-bridge in the fourth mode reaches the Tm, controlling the H-bridge in the third mode until the time for controlling the H-bridge in the third mode reaches the Ti.

In other words, before the DC-DC converter works, the total time TC for controlling the H-bridge in the third mode and the total time TD for controlling the H-bridge in the fourth mode are acquired from a storage area, the Ti and the Tm are set, then the total time TC and the total time TD are judged, and whether the H-bridge is controlled in the third mode or the fourth mode firstly is determined according to the judging result, that is, the total time TC for controlling the H-bridge in the third mode and the total time TD for controlling the H-bridge in the fourth mode are acquired from the storage area, and the relation between the total time TC and the total time TD is judged to determine the mode selected for controlling the H-bridge firstly when the DC-DC converter is started. For example, if the acquired TC is 20 minutes and the acquired TD is 18 minutes, when the DC-DC converter works currently, the fourth mode D is firstly selected to control the H-bridge to enable the DC-DC converter to start work, after 2 minutes, the mode is switched to the third mode C to control the H-bridge to enable the DC-DC converter to work until the time for controlling the H-bridge in the third mode C reaches the Ti, then the mode is switched to the fourth mode D to control the H-bridge, to enable the DC-DC converter to work until the time for controlling the H-bridge in the fourth mode D reaches the Tm, so as to complete a working cycle (time of one working cycle=Ti+Tm), then the mode is switched to the third mode C to control the H-bridge to enable the DC-DC converter to work until the time for controlling the H-bridge in the third mode C reaches the Ti, then the mode is switched to the fourth mode D to control the H-bridge to enable the DC-DC converter to work until the time for controlling the H-bridge in the fourth mode D reaches the Tm, . . . , and the process is repeated to realize alternate control on the H-bridge, thereby realizing temperature equalization control on the first switch transistor, the second switch transistor, the third switch transistor and the fourth switch transistor. If the acquired TC is 18 minutes and the acquired TD is 20 minutes, when the DC-DC converter works currently, the third mode C is firstly selected to control the H-bridge to enable the DC-DC converter to start work, after 2 minutes, the mode is switched to the fourth mode D to control the H-bridge to enable the DC-DC converter to work until the time for controlling the H-bridge in the fourth mode D reaches the Tm, then the mode is switched to the third mode C to control the H-bridge to enable the DC-DC converter to work until the time for controlling the H-bridge in the third mode C reaches the Ti, so as to complete a working cycle (time of one working cycle=Ti+Tm), then the mode is switched to the fourth mode D to control the H-bridge to enable the DC-DC converter to work until the time for controlling the H-bridge in the fourth mode D reaches the Tm, then the mode is switched to the third mode C to control the H-bridge to enable the DC-DC converter to work until the time for controlling the H-bridge in the third mode C reaches the Ti, . . . , and the process is repeated to realize alternate control on the H-bridge, thereby realizing temperature equalization control on the first switch transistor, the second switch transistor, the third switch transistor and the fourth switch transistor.

Of course, when the acquired total time TC is equal to the acquired total time TD, and when the DC-DC converter is started, the third mode C can be firstly used directly for controlling the H-bridge to enable the DC-DC converter to work until the time for controlling the H-bridge in the third mode C reaches the Ti, the mode is switched to the fourth mode D to control the H-bridge to enable the DC-DC converter to work until the time for controlling the H-bridge in the fourth mode D reaches the Tm, so as to complete a working cycle (time of one working cycle=Ti+Tm), then the mode is switched to the third mode C to control the H-bridge to enable the DC-DC converter to work until the time for controlling the H-bridge in the third mode C reaches the Ti, then the mode is switched to the fourth mode D to control the H-bridge to enable the DC-DC converter to work until the time for controlling the H-bridge in the fourth mode D reaches the Tm, . . . , and the process is repeated to realize alternate control on the H-bridge, thereby realizing temperature equalization control on the first switch transistor, the second switch transistor, the third switch transistor and the fourth switch transistor. Or, when the acquired total time TC is equal to the acquired total time TD, when the DC-DC converter is started, the fourth mode D can be firstly used directly for controlling the H-bridge to enable the DC-DC converter to work until the time for controlling the H-bridge in the fourth mode D reaches the Tm, the mode is switched to the third mode C to control the H-bridge to enable the DC-DC converter to work until the time for controlling the H-bridge in the third mode C reaches the Ti, so as to complete a working cycle, and such working cycle is repeated until the DC-DC converter stops working.

After the mode is selected in each working cycle, the H-bridge is controlled according to the fixed mode, namely the third mode or the fourth mode, and the total time is recorded when the mode is switched. For example, when the H-bridge is controlled in the third mode firstly, the total time for controlling the H-bridge in the third mode, recorded when the mode is switched, is the total time for controlling the H-bridge in the third mode, acquired from the storage area when the DC-DC converter starts working plus the time for controlling the H-bridge in the third mode, recorded in this working cycle of the DC-DC converter.

In an embodiment of the present disclosure, the set time Ti for controlling the H-bridge in the third mode can be equal to the set time Tm for controlling the H-bridge in the fourth mode, thereby enabling the heat generation of the first switch transistor Q1, the second switch transistor Q2, the third switch transistor Q3 and the fourth switch transistor Q4 to be relatively balanced when the H-bridge is alternately controlled in the third mode and the fourth mode.

Of course, it can be understood that, in other embodiments of the present disclosure, the set time Ti for controlling the H-bridge in the third mode can also be unequal to the set time Tm for controlling the H-bridge in the fourth mode.

It should be noted that, in the embodiments of the present disclosure, the control mode of lower transistor modulation is adopted for the DC-DC converter no matter whether the H-bridge is controlled in the third mode or the fourth mode. When the control mode of lower transistor modulation is adopted, two switch transistors as the upper transistors are alternately turned on at a duty ratio of 50% and have no dead time, and the adjustment of the output voltage is realized by adjusting the driving voltage falling edges of two switch transistors as the lower transistors.

Furthermore, in the control mode of lower transistor modulation, the two switch transistors as the upper transistors easily realize soft switching (zero voltage switching) and are corresponding to leading bridge arms in a control mode of phase shift modulation, and the two switch transistors as the lower transistors are corresponding to lagging bridge arms in the control mode of phase shift modulation and difficultly realize zero voltage switching.

According to the embodiments of the present disclosure, in the starting process of the DC-DC converter during the whole life cycle, the first switch transistor, the second switch transistor, the third switch transistor and the fourth switch transistor are alternately used as the upper transistors and the lower transistors, that is, Q1 and Q3 as well as Q2 and Q4 are alternately used as the upper transistors and the lower transistors, and then, temperature stress is equivalently distributed evenly in the four switch transistors of the H-bridge, so as to enable the heat generation of each switch transistor to be relatively balanced, thereby realizing overall heat balance and prolonging the service life of the DC-DC converter.

Figure 5:
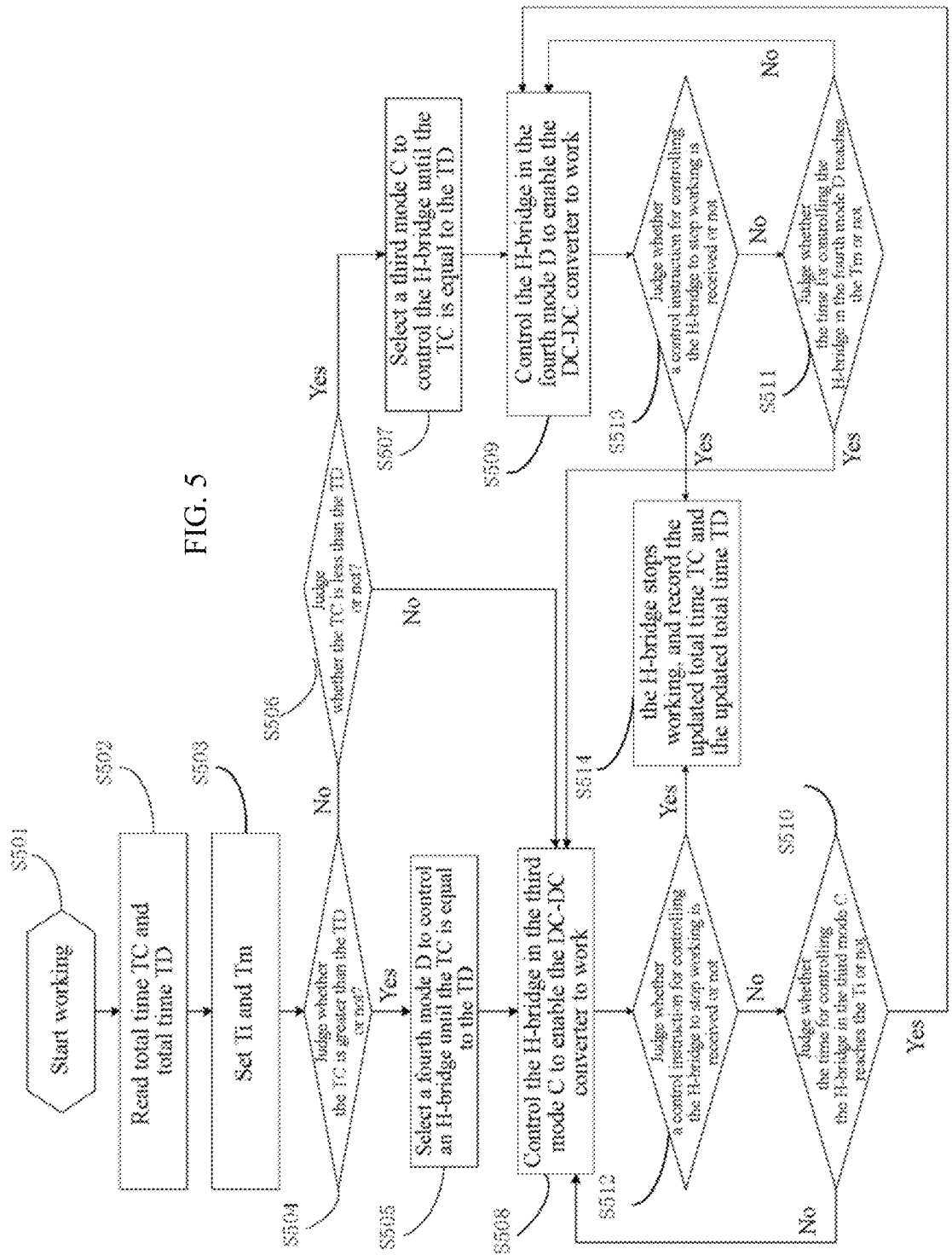
FIG. 5 is a flowchart of a control method of the DC-DC converter according to a specific embodiment of the present disclosure.

In an embodiment, according to an embodiment of the present disclosure, as shown in FIG. 5, the control method of the DC-DC converter includes the following steps:

S501, begin working, namely the DC-DC converter begins to start work.

S502, read the total time TC for controlling the H-bridge in the third mode C and the total time TD for controlling the H-bridge in the fourth mode D.

S503, set Ti and Tm.

S504, judge whether the TC is greater than the TD or not. If the TC is greater than the TD, execute S505; and if the TC is not greater than the TD, execute the step S506.

S505, control the H-bridge in the fourth mode D until the TC is equal to the TD, and then, execute the step S508.

S506, judge whether the TC is less than the TD or not. If the TC is less than the TD, execute the step S507; and if the TC is not less than the TD, execute the step S508.

S507, select the third mode C to control the H-bridge until the TC is equal to the TD, and then, execute the step S509.

S508, control the H-bridge in the third mode C to enable the DC-DC converter to work, and execute the step S512.

S509, control the H-bridge in the fourth mode D to enable the DC-DC converter to work, and execute S513.

S510, judge whether the time for controlling the H-bridge in the third mode C reaches the Ti or not. If the time for controlling the H-bridge in the third mode C reaches the Ti, execute the step S509; and if the time for controlling the H-bridge in the third mode C does not reach the Ti, return to the step S508.

S511, judge whether the time for controlling the H-bridge in the fourth mode D reaches the Tm or not; if the time for controlling the H-bridge in the fourth mode D reaches the Tm, execute the step S508; and if the time for controlling the H-bridge in the fourth mode D does not reach the Tm, return to the step S509.

S512, judge whether a control instruction for controlling the H-bridge to stop working is received or not. If the control instruction is not received, executing the S510; and if the control instruction is received, enter the step S514.

S513, judging whether a control instruction for controlling the H-bridge to stop working is received or not; if the control instruction is not received, execute S511; and if the control instruction is received, enter the step S514.

S514, the H-bridge stops working, and record the updated total time TC and the updated total time TD.

In the step S506, if the judging result is that the TC is equal to the TD, the step S509 can be firstly executed and then the step S508 is executed, that is, the execution order of the step S509 and the step S508 can be exchanged.

In conclusion, the control method of the DC-DC converter according to the embodiments of the present disclosure can enable the heat generation of the first switch transistor, the second switch transistor, the third switch transistor and the fourth switch transistor to be relatively balanced in each working process of the DC-DC converter, and additional components are not needed, thereby lowering the cost and prolonging the working life of the DC-DC converter.

The control method of the DC-DC converter according to the embodiments of the present disclosure includes the following steps: when the DC-DC converter works every time, acquiring the total time TC for controlling the H-bridge in the third mode and the total time TD for controlling the H-bridge in the fourth mode, acquiring the set time Ti for controlling the H-bridge in the third mode and the set time Tm for controlling the H-bridge in the fourth mode in each working cycle during the working process of the DC-DC converter, then judging the relation between the total time TC and the total time TD, finally selecting the mode for controlling the H-bridge when the DC-DC converter is started according to the relation between the total time TC and the total time TD, and alternately controlling the H-bridge according to the Ti and the Tm during the working process of the DC-DC converter, so as to perform temperature equalization control on the first switch transistor, the second switch transistor, the third switch transistor and the fourth switch transistor, thereby enabling the heat generation of each switch transistor to be relatively balanced, prolonging the working life of the switch transistors in the H-bridge without increasing the cost, and further prolonging the life cycle of the DC-DC converter.

As shown in FIG. 1, the DC-DC converter according to the embodiments of the present disclosure includes an H-bridge and a control module 100 such as a micro control unit (MCU). The H-bridge includes a first switch transistor Q1, a second switch transistor Q2, a third switch transistor Q3 and a fourth switch transistor Q4, a first node A is formed between the first switch transistor Q1 and the second switch transistor Q2, and a second node B is formed between the third switch transistor Q3 and the fourth switch transistor Q4. The control module 100 is used for acquiring total time TC for controlling the H-bridge in a third mode and total time TD for controlling the H-bridge in a fourth mode when the DC-DC converter works every time, acquiring set time Ti for controlling the H-bridge in the third mode and set time Tm for controlling the H-bridge in the fourth mode in each working cycle during a working process of the DC-DC converter, selecting the mode for controlling the H-bridge when the DC-DC converter is started by judging the relation between the total time TC and the total time TD, and alternately controlling the H-bridge according to the set time Ti and the set time Tm, so as to perform temperature equalization control on the first switch transistor, the second switch transistor, the third switch transistor and the fourth switch transistor. When the H-bridge is controlled in the third mode, the control module uses the first switch transistor and the third switch transistor as upper transistors, uses the second switch transistor and the fourth switch transistor as lower transistors, and controls the first switch transistor, the second switch transistor, the third switch transistor and the fourth switch transistor by adopting a control mode of lower transistor modulation. When the H-bridge is controlled in the fourth mode, the control module uses the first switch transistor and the third switch transistor as lower transistors, uses the second switch transistor and the fourth switch transistor as upper transistors, and controls the first switch transistor, the second switch transistor, the third switch transistor and the fourth switch transistor by adopting a control mode of lower transistor modulation.

In the embodiments of the present disclosure, when the control module 100 controls the H-bridge in the third mode C to enable the DC-DC converter to work, the time for controlling the H-bridge in the third mode C is recorded to obtain the total time TC for controlling the H-bridge in the third mode, and then, the total time TC is stored; when the control module controls the H-bridge in the fourth mode D to enable the DC-DC converter to work, the time for controlling the H-bridge in the fourth mode D is recorded to obtain the total time TD for controlling the H-bridge in the fourth mode, and then, the total time TD is stored; and then, when the DC-DC converter is started every time to work, the control module judges the relation between the total time TC and the total time TD and selects the mode for controlling the H-bridge when the DC-DC converter is started according to the relation between the total time TC and the total time TD.

In an embodiment, according to an embodiment of the present disclosure, in the process that the control module selects the mode for controlling the H-bridge when the DC-DC converter is started according to the relation between the total time TC and the total time TD, when the total time TC is greater than the total time TD, the control module selects the fourth mode for controlling the H-bridge when the DC-DC converter is started until the total time TC is equal to the total time TD; when the total time TC is less than the total time TD, the control module selects the third mode for controlling the H-bridge when the DC-DC converter is started until the total time TC is equal to the total time TD; and when the total time TC is equal to the total time TD, the control module selects the third mode or the fourth mode for alternately controlling the H-bridge according to the Ti and the Tm when the DC-DC converter is started.

Furthermore, in the process that the control module alternately controls the H-bridge according to the set time Ti and the set time Tm, when the time for controlling the H-bridge in the third mode reaches the Ti, the H-bridge is controlled in the fourth mode until the time for controlling the H-bridge in the fourth mode reaches the Tm; or when the time for controlling the H-bridge in the fourth mode reaches the Tm, the H-bridge is controlled in the third mode until the time for controlling the H-bridge in the third mode reaches the Ti.

In other words, before the DC-DC converter works, the control module acquires the total time TC for controlling the H-bridge in the third mode and the total time TD for controlling the H-bridge in the fourth mode from a storage area, sets the Ti and the Tm, then judges the total time TC and the total time TD, determines whether the H-bridge is controlled in the third mode or the fourth mode firstly according to the judging result, acquires the total time TC for controlling the H-bridge in the third mode and the total time TD for controlling the H-bridge in the fourth mode from the storage area, and judges the relation between the total time TC and the total time TD to determine the mode firstly selected for controlling the H-bridge when the DC-DC converter is started. For example, if the acquired TC is 20 minutes and the acquired TD is 18 minutes, when the DC-DC converter works currently, the fourth mode D is firstly selected to control the H-bridge to enable the DC-DC converter to start work, after 2 minutes, the mode is switched to the third mode C to control the H-bridge to enable the DC-DC converter to work until the time for controlling the H-bridge in the third mode C reaches the Ti, then the mode is switched to the fourth mode D to control the H-bridge to enable the DC-DC converter to work until the time for controlling the H-bridge in the fourth mode D reaches the Tm, so as to complete a working cycle (time of one working cycle=Ti+Tm), then the mode is switched to the third mode C to control the H-bridge to enable the DC-DC converter to work until the time for controlling the H-bridge in the third mode C reaches the Ti, then the mode is switched to the fourth mode D to control the H-bridge to enable the DC-DC converter to work until the time for controlling the H-bridge in the fourth mode D reaches the Tm, . . . , and the process is repeated to realize alternate control on the H-bridge, thereby realizing temperature equalization control on the first switch transistor, the second switch transistor, the third switch transistor and the fourth switch transistor. If the acquired TC is 18 minutes and the acquired TD is 20 minutes, when the DC-DC converter works currently, the third mode C is firstly selected to control the H-bridge to enable the DC-DC converter to start work, after 2 minutes, the mode is switched to the fourth mode D to control the H-bridge to enable the DC-DC converter to work until the time for controlling the H-bridge in the fourth mode D reaches the Tm, then the mode is switched to the third mode C to control the H-bridge to enable the DC-DC converter to work until the time for controlling the H-bridge in the third mode C reaches the Ti, so as to complete a working cycle (time of one working cycle=Ti+Tm), then the mode is switched to the fourth mode D to control the H-bridge to enable the DC-DC converter to work until the time for controlling the H-bridge in the fourth mode D reaches the Tm, then the mode is switched to the third mode C to control the H-bridge to enable the DC-DC converter to work until the time for controlling the H-bridge in the third mode C reaches the Ti, . . . , and the process is repeated to realize alternate control on the H-bridge, thereby realizing temperature equalization control on the first switch transistor, the second switch transistor, the third switch transistor and the fourth switch transistor.

Of course, when the acquired total time TC is equal to the acquired total time TD, and when the DC-DC converter is started, the third mode C can be firstly used directly for controlling the H-bridge to enable the DC-DC converter to work until the time for controlling the H-bridge in the third mode C reaches the Ti, the mode is switched to the fourth mode D to control the H-bridge to enable the DC-DC converter to work until the time for controlling the H-bridge in the fourth mode D reaches the Tm, so as to complete a working cycle (time of one working cycle=Ti+Tm), then the mode is switched to the third mode C to control the H-bridge to enable the DC-DC converter to work until the time for controlling the H-bridge in the third mode C reaches the Ti, then the mode is switched to the fourth mode D to control the H-bridge to enable the DC-DC converter to work until the time for controlling the H-bridge in the fourth mode D reaches the Tm, . . . , and the process is repeated to realize alternate control on the H-bridge, thereby realizing temperature equalization control on the first switch transistor, the second switch transistor, the third switch transistor and the fourth switch transistor. Or, when the acquired total time TC is equal to the acquired total time TD, and when the DC-DC converter is started, the fourth mode D can be firstly used directly for controlling the H-bridge to enable the DC-DC converter to work until the time for controlling the H-bridge in the fourth mode D reaches the Tm, the mode is switched to the third mode C to control the H-bridge to enable the DC-DC converter to work until the time for controlling the H-bridge in the third mode C reaches the Ti, so as to complete a working cycle, and such working cycle is repeated until the DC-DC converter stops working.

After the mode is selected in each working cycle, the H-bridge is controlled according to the fixed mode, namely the third mode or the fourth mode, and the total time is recorded when the mode is switched. For example, when the H-bridge is controlled in the third mode firstly, the total time for controlling the H-bridge in the third mode, recorded when the mode is switched, is the total time for controlling the H-bridge in the third mode, acquired from the storage area when the DC-DC converter begins working currently plus the time for controlling the H-bridge in the third mode recorded in the current working cycle of the DC-DC converter.

According to an embodiment of the present disclosure, when the H-bridge is controlled in the third mode, the control signal output to the first switch transistor by the control module and the control signal output to the third switch transistor by the control module are complementary and have a fixed duty ratio, and falling edges of the control signals output to the second switch transistor and the fourth switch transistor are subjected to PWM control.

Furthermore, when the H-bridge is controlled in the fourth mode, the control signal output to the second switch transistor by the control module and the control signal output to the fourth switch transistor by the control module are complementary and have a fixed duty ratio, and falling edges of the control signals output to the first switch transistor and the third switch transistor are subjected to PWM control.

In the embodiments of the present disclosure, as shown in FIG. 1, each of the first switch transistor Q1, the second switch transistor Q2, the third switch transistor Q3 and the fourth switch transistor Q4 is an insulated gate bipolar transistor (IGBT). Of course, in other embodiments of the present disclosure, each of the first switch transistor Q1, the second switch transistor Q2, the third switch transistor Q3 and the fourth switch transistor Q4 can be a metal oxide semiconductor (MOS) transistor.

Preferably, according to an embodiment of the present disclosure, the set time Ti for controlling the H-bridge in the third mode can be equal to the set time Tm for controlling the H-bridge in the fourth mode, thereby enabling the heat generation of the first switch transistor Q1, the second switch transistor Q2, the third switch transistor Q3 and the fourth switch transistor Q4 to be relatively balanced when the H-bridge is alternately controlled in the third mode and the fourth mode.

Of course, it can be understood that, in other embodiments of the present disclosure, the set time Ti for controlling the H-bridge in the third mode can also be unequal to the set time Tm for controlling the H-bridge in the fourth mode.

When the DC-DC converter according to the embodiments of the present disclosure works every time, the control module is used for acquiring the total time TC for controlling the H-bridge in the third mode and the total time TD for controlling the H-bridge in the fourth mode, acquiring the set time Ti for controlling the H-bridge in the third mode and the set time Tm for controlling the H-bridge in the fourth mode in each working cycle during the working process, selecting the mode for controlling the H-bridge when the DC-DC converter is started by judging the relation between the total time TC and the total time TD, and alternately controlling the H-bridge according to the Ti and the Tm during the working process of the DC-DC converter, so as to perform temperature equalization control on the first switch transistor, the second switch transistor, the third switch transistor and the fourth switch transistor, thereby enabling the heat generation of each switch transistor to be relatively balanced, prolonging the working life of the switch transistors in the H-bridge without increasing the cost, and further prolonging the life cycle.

Figure 6:
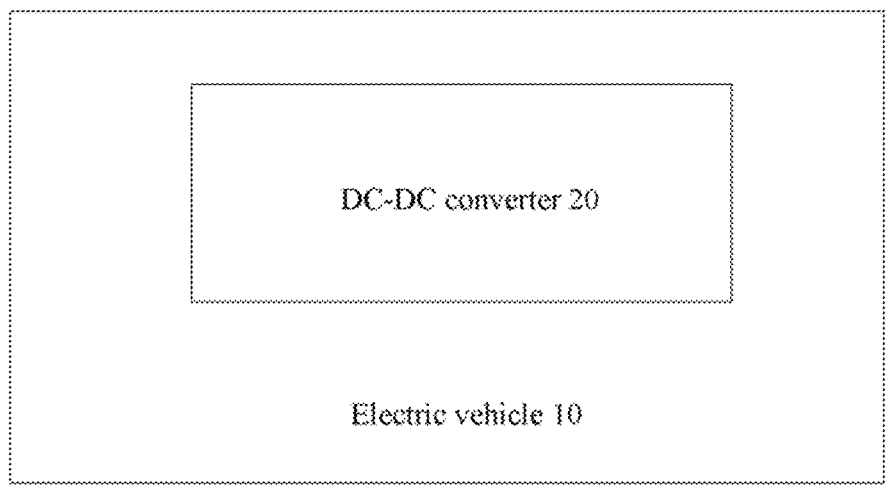
FIG. 6 is a block diagram of an electric vehicle according to the embodiments of the present disclosure.

Furthermore, as shown in FIG. 6, an embodiment of the present disclosure also provides an electric vehicle 10, including the DC-DC converter 20.

When the DC-DC converter of the electric vehicle according to the embodiments of the present disclosure works every time, the temperature equalization control on the first switch transistor, the second switch transistor, the third switch transistor and the fourth switch transistor in the H-bridge can be realized, thereby enabling the heat generation of each switch transistor to be relatively balanced, prolonging the working life of the switch transistors in the H-bridge without increasing the cost, and further prolonging the life cycle of the DC-DC converter.

The above descriptions are merely preferred embodiments of the present disclosure, and are not intended to limit the present disclosure in any form. Although the present disclosure has been disclosed above through the preferred embodiments, the embodiments are not intended to limit the present disclosure. Those skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A control method of a DC-DC converter, wherein the DC-DC converter comprises an H-bridge, the H-bridge comprises a first switch transistor, a second switch transistor, a third switch transistor, and a fourth switch transistor, and the control method comprises the following steps:

acquiring a total time TC for controlling the H-bridge in a first mode and a total time TD for controlling the H-bridge in a second mode, and acquiring a set time Ti for controlling the H-bridge in the first mode and a set time Tm for controlling the H-bridge in the second mode in each working cycle during a working process of the DC-DC converter when the DC-DC converter operates, wherein the first switch transistor and the third switch transistor are configured as upper transistors, the second switch transistor and the fourth switch transistor are configured as lower transistors when the H-bridge is controlled in the first mode, and the first switch transistor, the second switch transistor, the third switch transistor, and the fourth switch transistor are controlled by adopting a control mode of lower transistor modulation; and the first switch transistor and the third switch transistor are configured as lower transistors, the second switch transistor and the fourth switch transistor are configured as upper transistors when the H-bridge is controlled in the second mode, and the first switch transistor, the second switch transistor, the third switch transistor, and the fourth switch transistor are controlled by adopting a control mode of lower transistor modulation;

determining a relation between the total time TC and the total time TD; and selecting the mode for controlling the H-bridge when the DC-DC converter is started according to the relation between the total time TC and the total time TD, and alternately controlling the H-bridge according to the set time Ti and the set time Tm, so as to perform temperature equalization control on the first switch transistor, the second switch transistor, the third switch transistor, and the fourth switch transistor.

2. The control method of the DC-DC converter according to claim 1, wherein the step of selecting the mode for controlling the H-bridge when the DC-DC converter is started according to the relation between the total time TC and the total time TD comprises:

selecting the second mode for controlling the H-bridge when the DC-DC converter is started until the total time TC is equal to the total time TD, when the total time TC is greater than the total time TD;

selecting the first mode for controlling the H-bridge when the DC-DC converter is started until the total time TC is equal to the total time TD, when the total time TC is less than the total time TD; and selecting alternately the first mode or the second mode for controlling the H-bridge according to the Ti and the Tm when the DC-DC converter is started, when the total time TC is equal to the total time TD.

3. The control method of the DC-DC converter according to claim 1, wherein a control signal output to the first switch transistor and a control signal output to the third switch transistor are complementary and have a fixed duty ratio, and falling edges of control signals output to the second switch transistor and the fourth switch transistor are subjected to PWM control when the H-bridge is controlled in the first mode; and the control signal output to the second switch transistor and the control signal output to the fourth switch transistor are complementary and have a fixed duty ratio, and falling edges of the control signals output to the first switch transistor and the third switch transistor are subjected to PWM control when the H-bridge is controlled in the second mode.

4. The control method of the DC-DC converter according to claim 1, wherein the step of alternately controlling the H-bridge according to the set time Ti and the set time Tm comprises:

controlling the H-bridge in the second mode until the time for controlling the H-bridge in the second mode reaches the Tm when the time for controlling the H-bridge in the first mode reaches the Ti; or controlling the H-bridge in the first mode until the time for controlling the H-bridge in the first mode reaches the Ti when the time for controlling the H-bridge in the second mode reaches the Tm.

5. The control method of the DC-DC converter according to claim 1, wherein the set time Ti for controlling the H-bridge in the first mode is equal to the set time Tm for controlling the H-bridge in the second mode.

6. The control method of the DC-DC converter according to claim 2, wherein
a control signal output to the first switch transistor and a control signal output to the third switch transistor are complementary and have a fixed duty ratio, and falling edges of control signals output to the second switch transistor and the fourth switch transistor are subjected to PWM control when the H-bridge is controlled in the first mode; and
the control signal output to the second switch transistor and the control signal output to the fourth switch transistor are complementary and have a fixed duty ratio, and falling edges of the control signals output to the first switch transistor and the third switch transistor are subjected to PWM control when the H-bridge is controlled in the second mode.

7. The control method of the DC-DC converter according to claim 2, wherein the step of alternately controlling the H-bridge according to the set time Ti and the set time Tm comprises:
controlling the H-bridge in the second mode until the time for controlling the H-bridge in the second mode reaches the Tm when the time for controlling the H-bridge in the first mode reaches the Ti; or
controlling the H-bridge in the first mode until the time for controlling the H-bridge in the first mode reaches the Ti when the time for controlling the H-bridge in the second mode reaches the Tm.

8. The control method of the DC-DC converter according to claim 2, wherein the set time Ti for controlling the H-bridge in the first mode is equal to the set time Tm for controlling the H-bridge in the second mode.

9. The control method of the DC-DC converter according to claim 3, wherein the set time Ti for controlling the H-bridge in the first mode is equal to the set time Tm for controlling the H-bridge in the second mode.

10. A DC-DC converter, comprising:
an H-bridge, wherein the H-bridge comprises a first switch transistor, a second switch transistor, a third switch transistor, and a fourth switch transistor; and
a control module, wherein the control module is configured to acquire a total time TC for controlling the H-bridge in a first mode and a total time TD for controlling the H-bridge in a second mode when the DC-DC converter works, to acquire a set time Ti for controlling the H-bridge in the first mode and a set time Tm for controlling the H-bridge in the second mode in each working cycle during a working process of the DC-DC converter, to select the mode for controlling the H-bridge when the DC-DC converter is started by determining a relation between the total time TC and the total time TD, and to alternately control the H-bridge according to the set time Ti and the set time Tm, so as to perform temperature equalization control on the first switch transistor, the second switch transistor, the third switch transistor, and the fourth switch transistor, wherein
the control module uses the first switch transistor and the third switch transistor as upper transistors, uses the second switch transistor and the fourth switch transistor as lower transistors, and controls the first switch transistor, the second switch transistor, the third switch transistor, and the fourth switch transistor by adopting a control mode of lower transistor modulation when the H-bridge is controlled in the first mode; and
the control module uses the first switch transistor and the third switch transistor as lower transistors, uses the second switch transistor and the fourth switch transistor as upper transistors, and controls the first switch transistor, the second switch transistor, the third switch transistor, and the fourth switch transistor by adopting a control mode of lower transistor modulation when the H-bridge is controlled in the second mode.

11. The DC-DC converter according to claim 10, wherein
the control module is configured to select the second mode for controlling the H-bridge when the DC-DC converter is started until the total time TC is equal to the total time TD, when the total time TC is greater than the total time TD;
the control module is configured to select the first mode for controlling the H-bridge when the DC-DC converter is started until the total time TC is equal to the total time TD, when the total time TC is less than the total time TD; and
the control module is configured to select the first mode or the second mode for alternately controlling the H-bridge according to the Ti and the Tm when the DC-DC converter is started, when the total time TC is equal to the total time TD.

12. The DC-DC converter according to claim 10, wherein
when the H-bridge is controlled in the first mode, a control signal output to the first switch transistor by the control module and a control signal output to the third switch transistor by the control module are complementary and have a fixed duty ratio, and falling edges of control signals output to the second switch transistor and the fourth switch transistor are subjected to PWM control; and
when the H-bridge is controlled in the second mode, the control signal output to the second switch transistor by the control module and the control signal output to the fourth switch transistor by the control module are complementary and have a fixed duty ratio, and falling edges of the control signals output to the first switch transistor and the third switch transistor are subjected to PWM control.

13. The DC-DC converter according to claim 10, wherein
the control module is configured to control the H-bridge in the second mode until the time for controlling the H-bridge in the second mode reaches the Tm when the time for controlling the H-bridge in the first mode reaches the Ti; or
the control module is configured to control the H-bridge in the first mode until the time for controlling the H-bridge in the first mode reaches the Ti when the time for controlling the H-bridge in the second mode reaches the Tm.

14. The DC-DC converter according to claim 10, wherein the set time Ti for controlling the H-bridge in the first mode is equal to the set time Tm for controlling the H-bridge in the second mode.

15. An electric vehicle, comprising the DC-DC converter according to claim 10.

16. The DC-DC converter according to claim 11, wherein
a control signal output to the first switch transistor by the control module and a control signal output to the third switch transistor by the control module are complementary and have a fixed duty ratio, and falling edges of control signals output to the second switch transistor and the fourth switch transistor are subjected to PWM control when the H-bridge is controlled in the first mode; and the control signal output to the second switch transistor by the control module and the control signal output to the fourth switch transistor by the control module are complementary and have a fixed duty ratio, and falling edges of the control signals output to the first switch transistor and the third switch transistor are subjected to PWM control when the H-bridge is controlled in the second mode.

17. The DC-DC converter according to claim 11, wherein the control module is configured to control the H-bridge in the second mode until the time for controlling the H-bridge in the second mode reaches the Tm when the time for controlling the H-bridge in the first mode reaches the Ti; or the control module is configured to control the H-bridge in the first mode until the time for controlling the H-bridge in the first mode reaches the Ti when the time for controlling the H-bridge in the second mode reaches the Tm.

18. The DC-DC converter according to claim 10, wherein the set time Ti for controlling the H-bridge in the first mode is equal to the set time Tm for controlling the H-bridge in the second mode.

19. The DC-DC converter according to claim 11, wherein the set time Ti for controlling the H-bridge in the first mode is equal to the set time Tm for controlling the H-bridge in the second mode.

20. The DC-DC converter according to claim 12, wherein the set time Ti for controlling the H-bridge in the first mode is equal to the set time Tm for controlling the H-bridge in the second mode.

* * * * *